June 28, 1938.   W. P. SAGE   2,122,359
BAMBOO RAKE
Filed Sept. 4, 1936
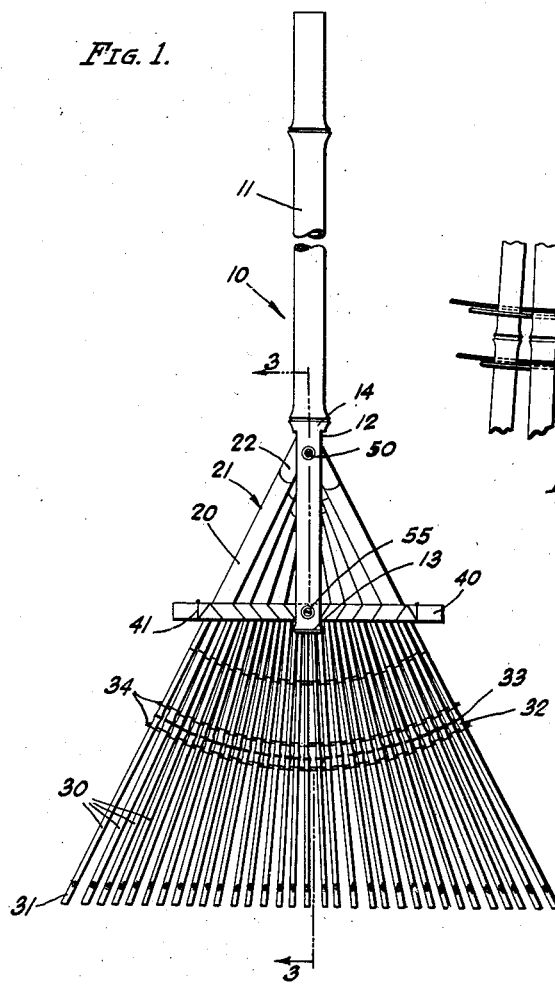
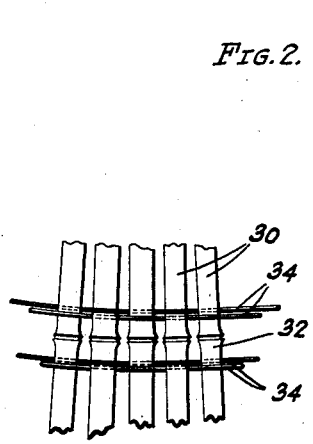
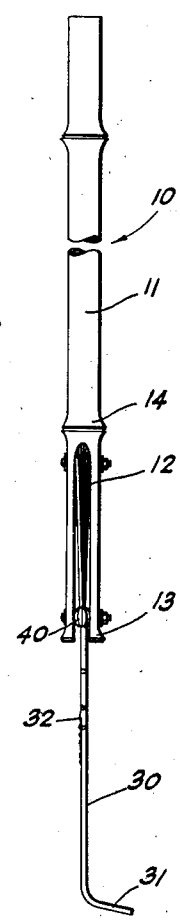
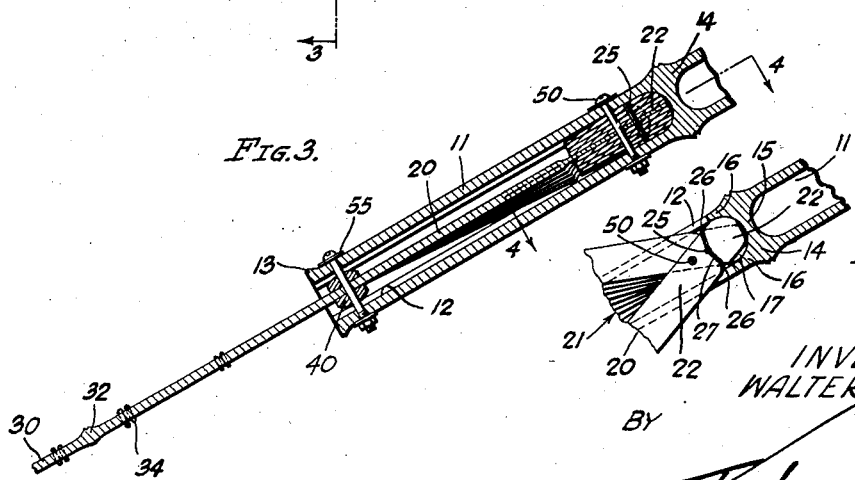
INVENTOR:
WALTER P. SAGE
BY
ATTORNEY.

Patented June 28, 1938

2,122,359

UNITED STATES PATENT OFFICE 2,122,359

BAMBOO RAKE

Walter P. Sage, Los Angeles, Calif.

Application September 4, 1936, Serial No. 99,455

9 Claims. (Cl. 55—114)

This invention relates to hand implements and more particularly to hand rakes.

It is an object of this invention to produce a bamboo rake which is inexpensive to manufacture, which nests readily when packed for shipping purposes, which is rugged in construction and which is self clearing of weeds and debris at the tips of the tines of the rake.

The manner of accomplishing the foregoing objects, as well as further objects and advantages, will be made manifest in the following description taken in connection with the accompanying drawing, in which:—

Fig. 1 is a plan view of a preferred embodiment of my invention.

Fig. 2 is an edge elevational view of Fig. 1.

Fig. 3 is an enlarged cross sectional view taken on the line 3—3 of Fig. 1.

Fig. 4 is a fragmentary detail sectional view taken on the line 4—4 of Fig. 3.

Fig. 5 is a fragmentary enlarged detail plan view looking in the same direction as Fig. 1 and showing the manner of reinforcing the ribs of the rake.

Referring specifically to the drawing, I show therein a rake 10, having a bamboo handle 11 which is provided with a slot 12 at its lower end. This slot reaches from a joint 13 at the lower extremity of the handle up approximately to a joint 14 which is located in the handle 11 next above the lower joint 13. The joint 14 includes a wall 15 and the slot 12 terminates before reaching this wall so as to leave a wall 16 which cooperates with the wall 14 to form a pocket 17.

The rake 10 also includes a plurality of bamboo ribs 20, which are assembled together as a fan 21 having a butt 22 formed by the overlapping of the inner or upper ends of the ribs 20. The ribs 20 in the fan 21 are united together entirely apart from their assembly with the handle 11 in three different ways. In the first place the ribs 20 are all drilled by a hole 25 which is located in the butt 22. The ribs 20 are notched at 26 and wires 27 are extended through the hole 25 and wrapped around the butt 22 so as to lie in the notches 26 and thus firmly bind all the ribs 20 together. Each of the ribs 20 is split to provide a plurality of tines 30, the end portions 31 of which are steamed and bent permanently downwardly at an angle substantially as shown in Fig. 2.

The ribs 20 are so assembled as to have a stalk joint enlargement 32 on each of these ribs lying in an arcuate line 33 when the fan 21 is assembled. Reinforcing wire 34 is then woven in and out amongst the tines 30 both within and beyond the joint enlargements 32. The ribs 20 of the fan 21 are also joined together substantially along the line crossing the fan and which coincides with the points up to which the splitting of the ribs is carried in forming the tines 30. This is accomplished by a pair of bamboo cross pieces 40 which lie on opposite sides of the fan 21 and which are bound together and to the fan by wires 41 which are wrapped around the cross pieces 40 and woven in and out among the fan ribs 20.

The manner of assembling the handle 11 and the fan 21 of my rake 10 is as follows. The butt 22 of the fan 21 is first inserted into the slot 12 as far as it can go, as shown in Figs. 3 and 4. The butt 22 is thus rammed into the pocket 17 so that unless it is withdrawn from this pocket it cannot escape from it except by a breach of one of the walls 16. A hole is now bored through the handle 11 and the butt 22, and a bolt 50 is inserted in place in this hole and screwed tight to permanently retain the fan butt in place. With the fan 21 symmetrically located relative to the handle 11 a hole is then bored through the lower end of this handle and the cross pieces 40 and a bolt 55 is inserted in place here and tightened up so as to rigidly clamp the end of the handle to the fan. If it should be desired, rivets may of course be used in place of the bolts 50 and 55, although the bolts afford an opportunity for repairing the rake where one or more of the ribs become broken and it is preferable to replace these rather than throw the entire rake away.

Particular attention is called to the inexpensive reinforcing construction found in the wires 34 which are disposed on opposite sides of the joint enlargements 32 of the tines 30. This reinforcement binds these tines together in a flexible manner so as to prevent damage to the individual tines when placed under undue strain. The formation of the tines 30 so that each has a joint enlargement 32, the assembling of these tines so that these joint enlargements are disposed in an arcuate, curved line, as shown in Fig. 1, and the binding of the tines 30 together adjacent these joint enlargements by a suitable flexible means, such as the wires 34, strengthens the tines 30 much more than if the reinforcement 34 was used without this being disposed adjacent the joint enlargements 32. While I prefer the wire reinforcement 34 for binding the tines 30 together adjacent the joint enlargements 32, it is clear, of course, that various reinforcing means may be used to perform this purpose.

It is also to be noted that the manner of binding the butt 22 of the fan 21 and inserting this into the pocket 17 produces a strong union between the fan and the handle particularly when united with the action of the bolts 50 and 55 in binding the fan and handle together.

The locating of the handle 11 with the joint 14 just above the inner end of the slot 12 greatly strengthens the union between the handle 11 and the butt 22 of the fan 21.

From the foregoing description it is clear that I have produced a bamboo rake which is unusually sturdy and economical in construction. It is also evident that this rake can nest readily when packed one above the other for shipment, and that the angle of the tips 31 of the tines 30 results in automatic clearing of refuse from lodgement upon the tines.

What I claim is:—

1. In a bamboo rake the combination of: a bamboo handle, there being a slot in an end portion of this; a fan formed of a multiplicity of bamboo ribs spread out from the inner end of said slot where the butt ends of said ribs are overlapped, pierced with a wire and bound together to form a fan butt; cross piece means connecting said ribs where said ribs are spread a substantial distance and secured to said end portion of said handle; and means for securing said fan butt to said handle.

2. In a bamboo rake the combination of: a bamboo handle, there being a slot in an end portion of this; a fan formed of a multiplicity of bamboo ribs spread out from the inner end of said slot where the butt ends of said ribs are overlapped, pierced with a wire and bound together to form a fan butt; cross piece means connecting said ribs where said ribs are spread a substantial distance and secured to said end portion of said handle; and a bolt passing through said handle and said fan butt to bind these together.

3. A combination as in claim 1 in which said cross piece means comprises cross pieces on opposite faces of said fan ribs and secured to the latter, said cross pieces being disposed within said slot.

4. In a bamboo rake the combination of: a bamboo handle, there being a slot in an end portion of this; a fan formed of a multiplicity of ribs the butt ends of which overlap; means for securing the butt ends of said ribs together to form a fan butt which extends into said slot to its inner end; and means for rigidly connecting said fan ribs to said handle adjacent said end of said handle where said ribs are already spread a substantial distance.

5. A combination as in claim 4 in which said last mentioned means comprises cross pieces wired to opposite faces of said fan, lying within said slot and secured to said handle by a bolt passing through said cross pieces, said handle and said fan.

6. A combination as in claim 1 in which said slot is formed to terminate closely in advance of a joint in said handle.

7. A combination as in claim 1 in which said slot is formed to terminate close to a joint in said handle and in which the means for securing said fan butt to said handle comprises a bolt passing through said butt and said handle adjacent said joint.

8. A combination as in claim 4 in which the slot in said handle is formed with its inner end terminating adjacent a natural joint in said bamboo handle.

9. In a bamboo rake the combination of: a bamboo handle having a joint spaced inwardly from the end thereof and a slot in said end, said slot terminating closely in advance of said joint to form a pocket immediately adjacent said joint; a fan formed of a multiplicity of ribs, the butt ends of which overlap; means uniting the butt ends of said ribs to form a fan butt, the latter extending into said pocket; means for securing the butt ends of said ribs disposed in said pocket to said handle; and means for rigidly connecting said handle adjacent the end of the latter to said ribs where these ribs are already spread a substantial distance.

WALTER P. SAGE.